(No Model.)
W. H. MINNIX.
MECHANISM FOR OPERATING WHEELED VEHICLES.
No. 435,665. Patented Sept. 2, 1890.
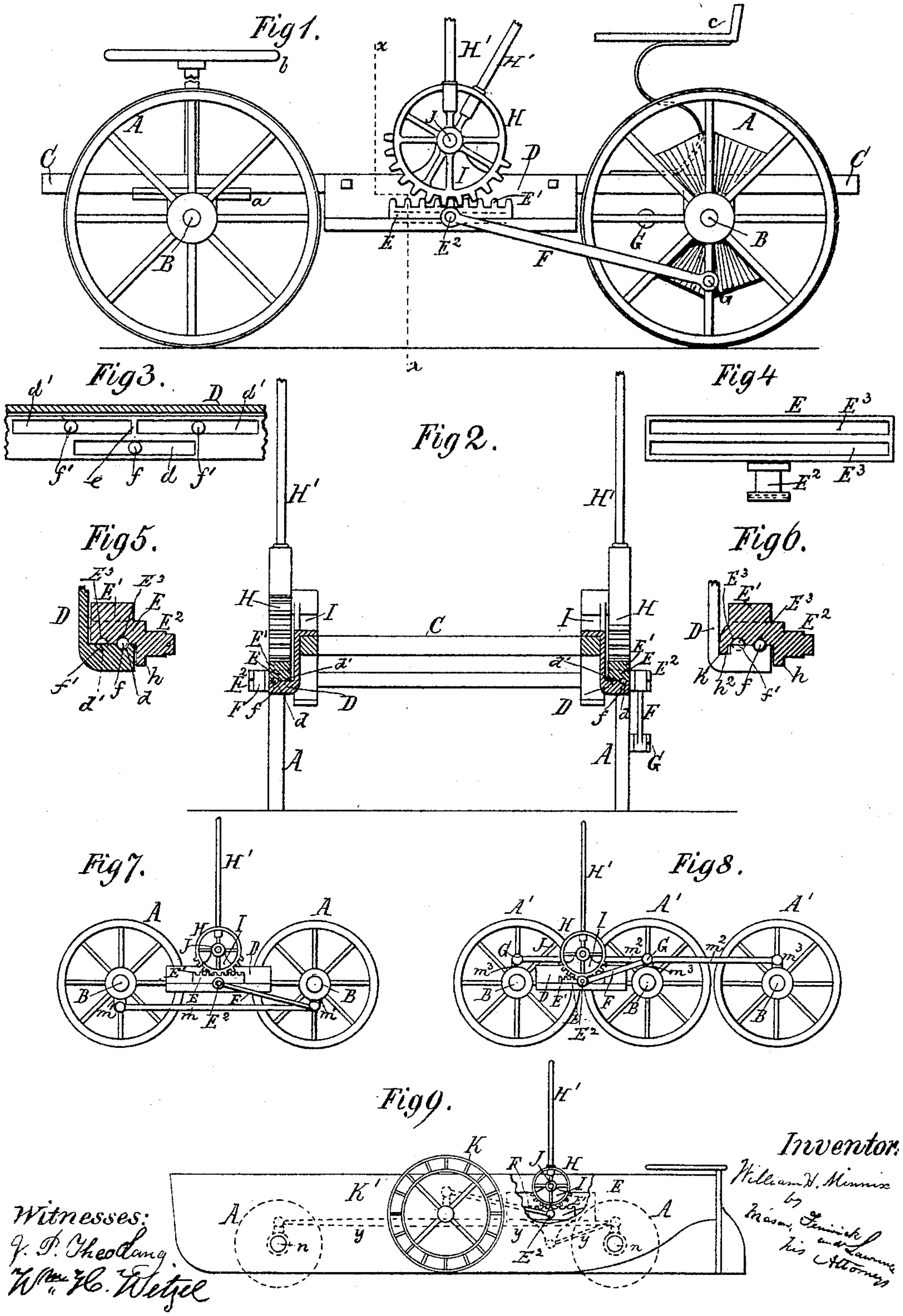
Inventor:
William H. Minnix
by Mason, Fenwick and Lawrence
his Attorneys
Witnesses:
J. P. Theo Lang
Wm. H. Wetzel
THE NORRIS PETERS CO., PHOTO-LITHO., WASHINGTON, D. C.

UNITED STATES PATENT OFFICE.

WILLIAM H. MINNIX, OF WASHINGTON, DISTRICT OF COLUMBIA.

MECHANISM FOR OPERATING WHEELED VEHICLES.

SPECIFICATION forming part of Letters Patent No. 435,665, dated September 2, 1890.

Application filed February 19, 1890. Serial No. 341,076. (No model.)

*To all whom it may concern:*

Be it known that I, WILLIAM H. MINNIX, a citizen of the United States, residing at the city of Washington, in the District of Columbia, have invented certain new and useful Improvements in Mechanical Movements for Operating Wheeled Vehicles or Structures; and I do hereby declare the following to be a full, clear, and exact description of the invention, such as will enable others skilled in the art to which it appertains to make and use the same.

My invention consists in a novel mechanical movement for wheeled vehicles or other transportation structures designed for moving on land or water, and by means of the same a conveniently-manipulated and easily-operated wheeled carriage, wagon, or vehicle of any known form of body and running-gear is produced at very moderate expense.

In the accompanying drawings, Figure 1 is a side elevation of a wheeled truck, wagon, or carriage constructed in accordance with my invention. Fig. 2 is a transverse section of the same in the line $x$ $x$ of Fig. 1. Fig. 3 is an enlarged broken detail plan view of one of the stationary hangers or supporting and guiding plates or bars with grooves and anti-friction balls of the mechanical movement. Fig. 4 is an inverted plan view of one of the toothed and grooved sliding plates or bars of the mechanical movement. Fig. 5 is a detail cross-section of one of the stationary hangers or supporting grooved plates or bars and one of the toothed moving parts of the mechanical movement, showing one of the balls by full lines and one of the grooves in the same manner, and another of the grooves and balls by dotted lines. Fig. 6 is a cross-section of a moving toothed plate or bar and an end elevation of a hanger or stationary supporting plate or bar slightly modified. Fig. 7 is a side elevation of a wheeled truck, wagon, or carriage having four wheels, the front and rear wheels being connected by a connecting-rod operated by my mechanical movement. Fig. 8 is a side elevation of a six-wheel truck, wagon, or carriage, the wheels being connected by connecting-rods operated by my mechanical movement; and Fig. 9 represents a boat adapted to be propelled at will on water or land by my mechanical movement.

A A in the drawings, Figs. 1, 2, and 7, represent two of the wheels of a four-wheel vehicle, and A′ A′ A′, Fig. 8, represent three of the wheels of a six-wheel vehicle. The wheels have revolving axles, and said axles are fitted in bearings, in any appropriate manner, of a frame C, of any suitable construction and style and with or without springs, as is common in such structures. The power-wheels are preferably fitted to revolve with the axle or axles, while the front wheels (or a single wheel substituted therefor) may be loose on the axle and provided with a circle-plate $a$, and any suitable means—as, for instance, such as indicated by $b$—by which to turn the vehicle to the right or left or around. One or more seats, as $c$, may also be provided for the operator and persons riding.

On each side bar of the frame C an angular hanger or supporting plate or bar D, of metal or other suitable material, is applied, and in the bracket or horizontal ledge of the same grooves $d$ $d'$, adapted for balls or rollers, are provided, and in these grooves anti-friction balls $f$ $f'$ (or rollers) are placed. The grooves $d'$ $d'$ are divided by a transverse partition $e$, so that the balls or rollers shall not roll in contact with one another. The groove $d$ is formed so as to extend one half its length forward of the partition $e$ and the other half in rear of the same, and it is also laterally outside the line of the grooves $d'$, so that any tendency of the moving plates or bars, which ride upon the balls or rollers, to move laterally and diagonally shall be counteracted.

Upon each hanger D a sliding metal plate or bar E, having rack-teeth E′ on its top, and a connecting wrist-pin $E^2$ on its side, and grooves $E^3$ in its bottom, is fitted so that the balls enter the grooves $E^3$ $E^3$ to the same extent that they enter the grooves $d$ $d'$, as illustrated in the cross-sectional views.

To the wrist-pins $E^2$ of the plates or bars E E are attached connecting-rods F, which connect the sliding toothed plates or bars to crank-pins G of the vehicle-wheels, as shown, or to cranks of the axles of the wheels, if desired. Above the sliding racks toothed wheels or sectors H of levers H′ are pivoted to upright standards or posts I of the hangers D by means of pivots J, or they might be loosely attached to a transverse stay shaft or bar extended from the standards and secured fast in the same. The teeth of the lever wheels or sectors gear with the teeth of the sliding rack plates or bars E. The wrist-pins of the respective pairs of propelling-wheels A A (or the cranks of the axles of the wheels) are set at right angles to one another, or the pin G of one of the propelling-wheels of a pair (or one of the cranks of the axle) is set in advance or in rear of the other, and the racks and lever-sectors are thus enabled to avoid dead-centers, and the operator by moving the lever-sectors to any extent necessary can move the racks in proper directions, and thereby cause the wheels to revolve together in the same direction, and thus propel the vehicle forward; and he can also at will instantly reverse the movement of the wheels. The lever-sectors afford great power, and the friction balls or rollers allow the sliding racks to slide along with very slight resistance, while they prevent lateral movement of the racks during the operation.

I have shown in Fig. 5 a vertical extension or boss $h$ on the sliding tooth-bar E at the point where the wrist-pin $E^2$ is applied. This gives strength and support at this point and serves to prevent the plates or bars moving inward laterally; and in Fig. 6 I have shown a vertical flange $h'$ on the bar E, which extends down loosely in a guideway $h^2$ of a hanger D and serves for keeping the sliding rack from moving off said hanger in an outward direction laterally. It might be practicable to dispense with some of the anti-friction ball-grooves, or not to use any grooves or balls, and this I regard as within the scope of my claim; but the balls are very essential for avoiding friction, and the grooves for keeping the parts together when flanges are not provided.

In Fig. 7 the invention is not changed, but is applied for operating four wheels A A, connected in pairs by rods $m$, said rods being connected to wrist-pins of cranks $m'$.

In Fig. 8 the invention is not changed, but is applied for operating six wheels A A′, connected in triplets by rods $m^2$ $m^2$, said rods being attached to wrist-pins of crank-arms $m^3$ $m^3$ $m^3$.

In Fig. 9 the invention is not changed, but is applied for operating paddle-wheels, as K, on each side of a boat, carriage, or other transportation structure, as K′, which structure is adapted, by means of bearings $n$ $n$, for having applied to it at will land propelling-wheels, as A A, and the described mechanical movement in the manner indicated by the dotted lines $y$ $y$ $y$.

It is contemplated to change the position of the wrist-pins $E^2$ to one or the other of the sides of the center of the length of the racks or to the ends of the same; but it is preferable to place them at or near the middle of the same, as shown, as by this arrangement the racks when set far enough inward can be passed between the wheels, and they are less liable to be lifted from their hangers D D. The propelling-wheels might be made loose on their axle or axles and the connecting-rods connected to cranks formed on or attached to the axle, and the wheels revolved independently of one another by means of the racks and lever-sectors, but not so advantageously as when revolved with the axles.

It might be practicable, while retaining my entire invention, to actuate the lever-toothed wheels or sectors by a steam, air, water, electric, gas, or any other mechanical motor; but I have specially designed the mechanical movement for vehicles, so as to be operated by manual power.

The upper ends of the hand-levers might be bent or curved over horizontally and then extended downward and terminated in foot-pedals, and thus the mechanical movement adapted for being operated by the feet, and the handles thus bent might have horizontal hand-holds extending out from their sides, so that the hands as well as the feet might be used for operating the mechanical movement, and the hand-levers might be extended to a greater height and connected by horizontal rods to auxiliary pendulum-levers pivoted on auxiliary standards, said pendulum-levers being within control of the hand or feet of the operator; but no special claim is set up here for such special attachments. Friction-rollers of an oval form or truncated at both ends would be the equivalents of the balls, and might be substituted for the balls without departing from my invention.

I do not claim any one of the forms of vehicles or transportation structures shown, nor any one of the modes of connecting two pairs or three pairs of wheels, nor the special mode of adapting a boat propelled by my mechanical movement for running on land-wheels propelled by such means, as my invention lies in the mechanical movement shown and its combination with one or more power or propelling wheels of any vehicle or transportation structure.

What I claim is—

1. In combination with a wheeled vehicle or other wheeled transportation structure, the within-described mechanical movement, comprising the supporting plates or bars, sliding rack plates or bars, means, as described, for connecting the rack to its support and keeping it from having undue lateral movement inward or outward, toothed lever wheels or sectors, and connecting-rod, substantially as described.

2. In a mechanical movement, the combination of the supporting plate or bar, sliding toothed rack plate or bar, means, as described, for connecting the rack to its support and keeping it from having undue lateral movement inward or outward, lever-toothed wheel or sector, connecting-rod, and a wheel or axle to which the rod is connected, substantially as described.

3. The combination of the supporting plate or bar provided with grooves and anti-friction balls or rollers, sliding rack plate or bar provided with grooves to receive the balls or rollers, the lever wheel or sector, and the connecting-rod, substantially as dscribed.

4. In a mechanical movement, the combination of the supporting plate or bar provided with separated grooves on one line and a single groove intermediate of and lateral to the separated grooves, balls or rollers in the grooves, sliding rack plate or bar having two grooves, the lever-toothed wheel or sector, and the connecting-rod, substantially as described.

In testimony whereof I hereunto affix my signature in presence of two witnesses.

WILLIAM H. MINNIX.

Witnesses:
WM. H. WETZEL,
WM. M. BELT.